Aug. 30, 1955  J. V. BERTRAND  2,716,421
VALVE SEAT RETAINING AND REMOVAL MEANS
Filed Dec. 1, 1950  3 Sheets-Sheet 1
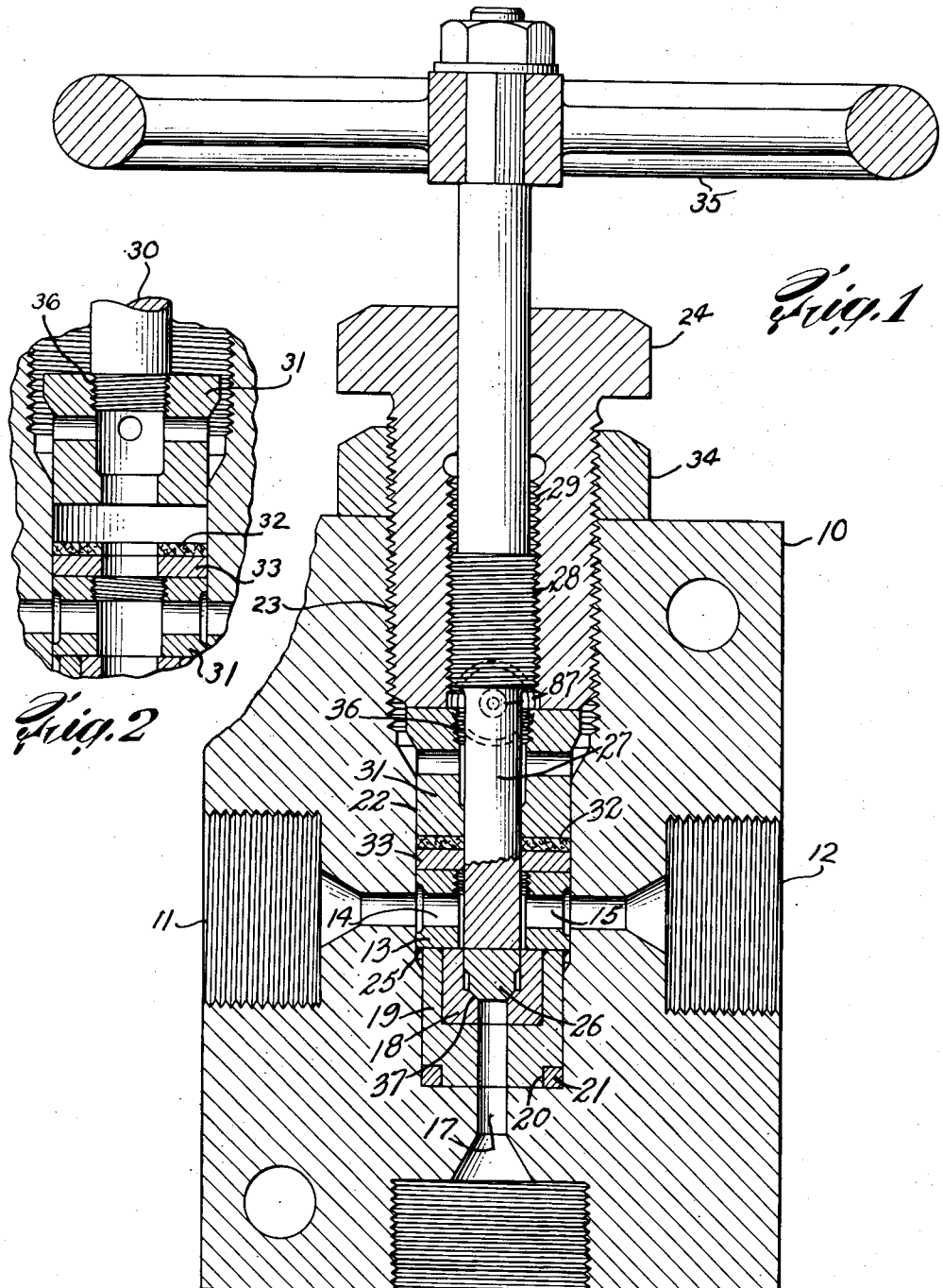
INVENTOR.
JOSEPH V. BERTRAND
BY Pollard & Johnston
ATTORNEYS

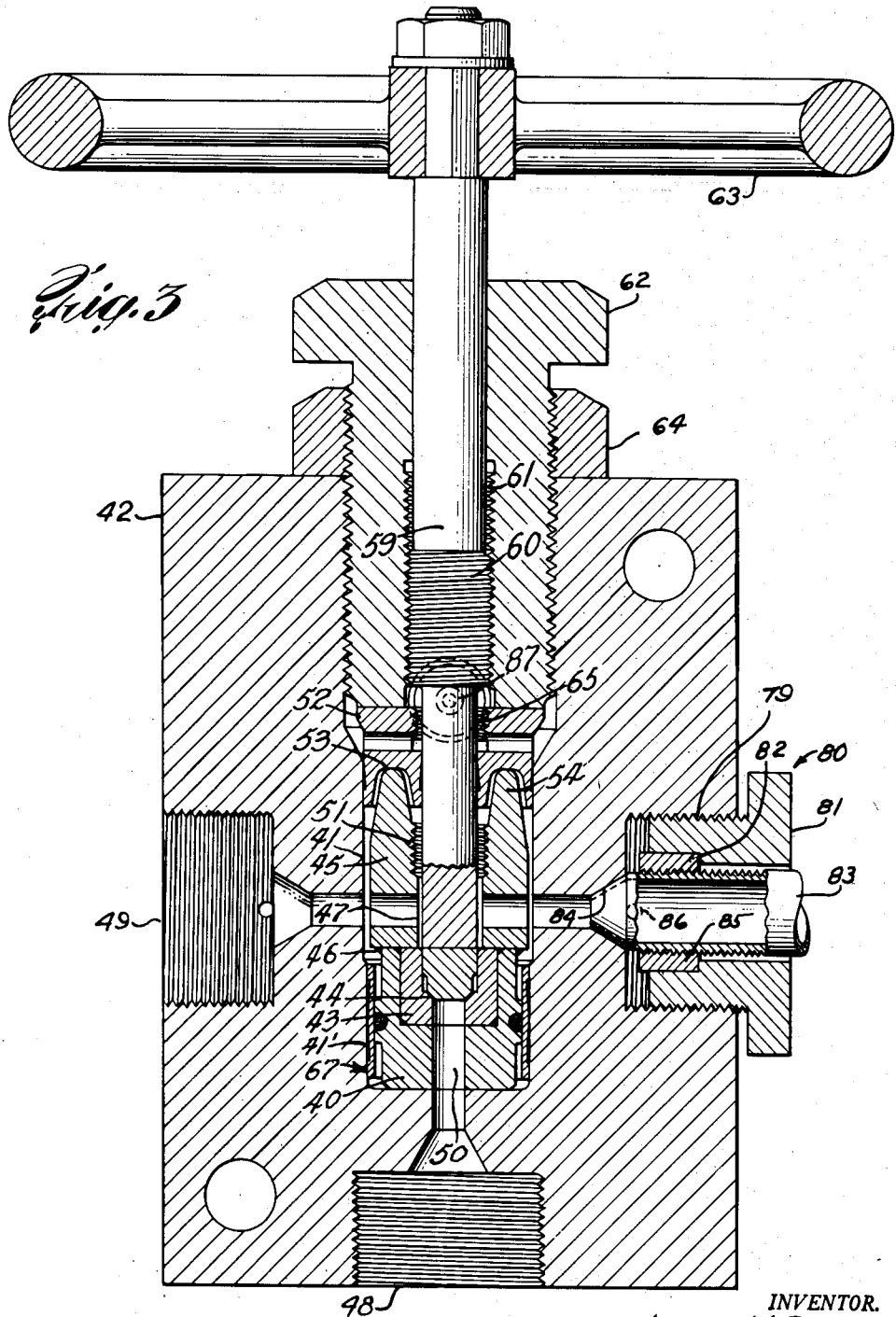

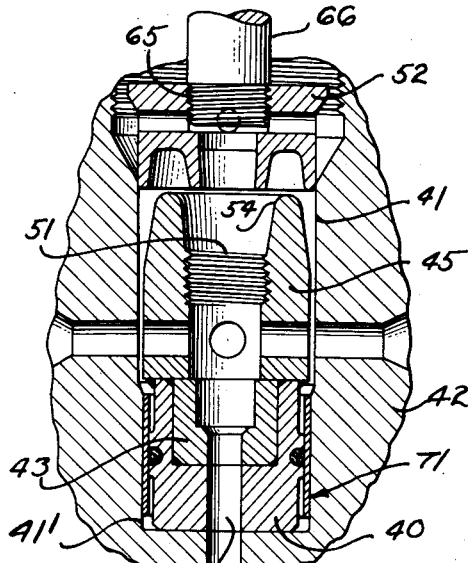
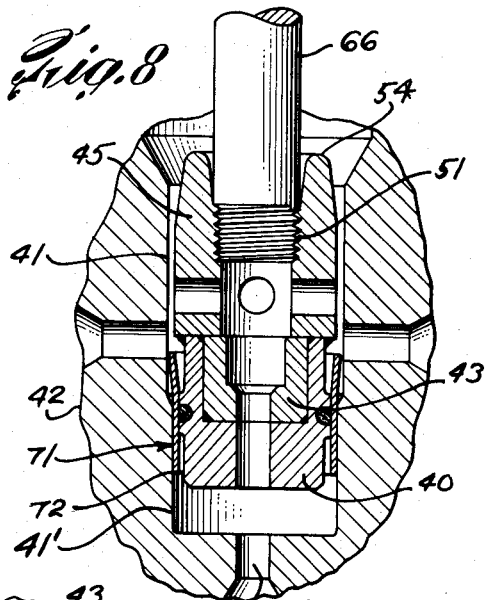
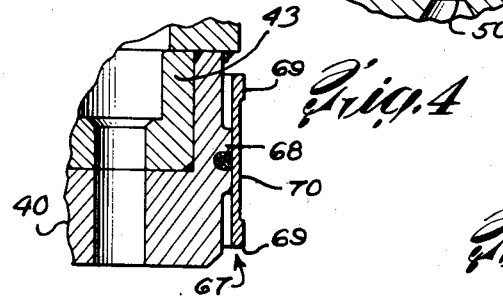
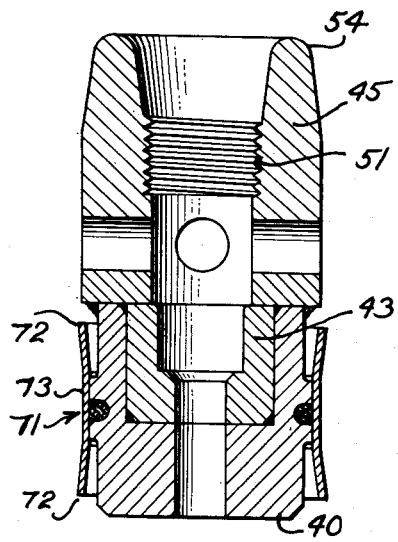
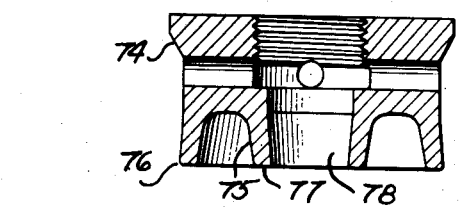
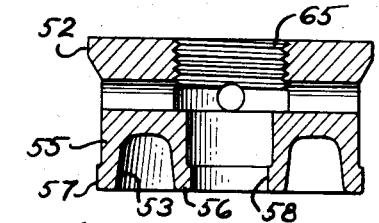

United States Patent Office 2,716,421
Patented Aug. 30, 1955

2,716,421

VALVE SEAT RETAINING AND REMOVAL MEANS

Joseph V. Bertrand, Brooklyn, N. Y., assignor to Hydropress, Incorporated, New York, N. Y., a corporation of Delaware Application December 1, 1950, Serial No. 198,512

5 Claims. (Cl. 137—327)

This invention relates to valves and particularly valves for high pressure operation.

One of the problems in dealing with high pressures such as in the range of 20,000 pounds per square inch, and also high temperatures, is the factor of leakage through the various parts of a valve. Another problem is the wear of parts due to the flow of high pressure fluid therethrough.

One of the objects of the invention is to provide an improved construction whereby the parts can be removed and replaced with ease.

Another object of the invention is to provide a construction wherein a valve seat holder is arranged to maintain a tight joint relative to the valve body itself.

A still further object of the invention is to provide an improved valve stem seal construction.

In one aspect of the invention, a valve body having a bore therein is arranged to receive a valve seat holder and insert in said bore. The seat and insert, of course, could be integral. Attached to the valve seat holder may be a valve cage arrangement. The valve seat and a stem cooperate to control flow through the valve. The valve seat may have a bore and a seal at the bottom thereof, the valve on the valve stem entering the bore and being guided therein, this not being a positive seal. The end of the stem contacts the seat at the bottom of the bore to positively shut off fluid flow. The valve seat means thus is stepped and arranged so that as the stem engages the bore in the valve seat, it materially restricts flow and thus reduces the fluid velocity between the valve and its main seat just prior to closing. The valve cage arrangement can have a threaded aperture for receiving an assembly or pull-out rod so as to assemble or remove the valve seat insert, valve seat holder, and cage as a unit relative to said bore. The valve seat holder and cage could be made of one piece if desired.

A seal gland may be located in said bore over said cage and may be held in place by a gland nut arrangement means mounted in the valve body. The stem seal also can have a threaded aperture for receiving an assembly rod or means for extraction from the valve body or replacement therein. The valve seat holder preferably has a means for maintaining a pressure tight joint relative to said bore.

In one form, the aforementioned valve seat holder can have a skirt-like seal arrangement sized and constructed so that when it is in said bore in the valve body, the skirt will be stressed into sealing engagement with the valve body. Said skirt has portions thereof of greater diameter than said bore before the seat holder is inserted therein. As the valve parts change dimensions under high pressure, the seal will be maintained, yet the valve seat holder and valve seat insert can be removed for replacement of the seat when such becomes necessary.

The valve stem seal also can have its exterior formed so as to have a pair of legs which when in the bore in said valve body with the stem in position, will be stressed. Thus a tight joint will be maintained between the exterior of the stem seal and the bore as well as between the stem aperture and the stem therethrough, regardless of expansion of the various parts.

These and other objects, advantages, and features of the invention will become apparent from the following description and drawings which are merely exemplary.

In the drawings:

Figure 1 is a sectional view with a portion broken away showing one form of the valve.

Figure 2 is a fragmentary sectional view similar to Figure 1 showing one part of the valve being removed or replaced.

Figure 3 is a sectional view of another form of the valve.

Figure 4 is a fragmentary enlarged portion of the valve seat insert and valve seat holder of Figure 3.

Figure 5 is an enlarged detail of the valve stem seal of Figure 3.

Figure 6 is an enlarged fragmentary sectional view of a modified form of the valve of Figure 3, the valve stem seal being partially assembled or disassembled.

Figure 7 is an enlarged fragmentary view of the valve cage, seal, and holder assembly of Figure 6.

Figure 8 is a fragmentary sectional view showing the assembly of Figure 7 being removed or replaced in the valve body.

Figure 9 is the valve stem seal of Figure 6.

Referring to the form shown in Figure 1, valve body 10 may be constructed of stainless steel, or any other suitable metal. The valve shown is an angular valve, but the invention can be applied to other forms.

Threaded valve openings 11 and 12 are provided leading to the valve cage 13 in the valve body bore 22, said cage having apertures 14, 15 corresponding to the openings 11 and 12. Valve body bore 22 is illustrated as having several different diameters along its length. Either of the openings 11 or 12 can have a plug placed therein so as to block it off, the other opening then being connected to one of the pipes or lines to be controlled. The other opening 16 is connected with passage 17 leading to valve seat 37. Valve seat insert 18, for example, may be made of tungsten carbide, titanium carbide or other hard metal suitable for a high pressure valve seat arrangement.

Valve seat insert 18 can be mounted in an aperture in valve seat holder 19, the valve seat holder 19 having an annulus 20 in one end thereof in which a suitable gasket or seal member 21 is mounted for sealing the holder 19 relative to bore 22 of the valve body. Bore 22 may have a threaded portion 23 for threadedly receiving gland nut 24.

The valve cage 13 can be fastened to the valve seat holder 19 by means of welding 25 so that the valve seat insert 18, valve seat holder 19, and valve cage 13 constitute a single unit for assembly and removal purposes.

The valve tip member 26, which cooperates with valve seat 37, can be made of a material similar to valve seat insert 18, said valve tip being carried by valve stem 27. Valve stem 27 has a threaded portion 28 cooperating with threads 29 of gland nut 24. Turning of hand wheel 35 will serve to raise and lower the valve stem 27 and valve tip 26 relative to its valve seat 37. The valve stem seal means can include a stem seal gland 31 mountable in the bore 22, there being a suitable stem seal gasket or washer 32 and stem seal washer 33 between the stem seal gland 31 and the valve cage 13.

Preferably, the valve stem 27 is chrome plated, or similarly plated or treated, so as to reduce galling and other undesirable wear which may occur therein. This is especially a problem in a high pressure valve.

When it is desired to remove or assemble the parts of the valve illustrated in Figure 1, gland lock nut 34 is loosened and gland nut 24 removed. As a result thereof, valve stem 27 and hand wheel 35 will be disassembled relative to the valve body. A pull rod 30 (Figure 2) can be inserted into the screw threads 36 (Figures 1, 2) located in valve stem seal gland so as to be able to pull the valve stem seal gland 31 upwardly and out of the valve body as illustrated in Figure 2, or to replace the same.

In another form of the valve, such as seen in Figure 3, the valve holder can have a skirt-like seal arrangement for maintaining a seal with the bore in the valve body at all times. Valve seat holder 40 is inserted in the bore 41 of the valve body 42, valve seat insert 43 having a valve seat 44, said insert being mounted in a suitable aperture in the valve seat holder 40.

Valve cage 45 can be fastened to the valve holder 40 in some suitable manner, such as by welding at 46. The valve cage has a valve stem receiving aperture 47 therethrough.

Valve openings 48 and 49 can be provided in the valve body 42, said passages being the inlet and outlet openings as desired. Valve opening 48 leads to aperture 50 in the valve seat holder 40 and valve seat insert 43. Opening 49 can be suitably aligned with the appropriate aperture in the valve cage 45, and, as will be explained hereafter, the opening 79 can have a suitable plug therein. Valve cage 45 may have a threaded portion 51 for receiving a pull-out or assembly rod similar to that described for Figures 1 and 2.

A valve stem seal means 52 is provided having an annulus 53 therein receiving the tapered upper end 54 of the valve cage 45. The annulus of the stem seal 52 defines an outer leg or ring 55 (Figure 5) and an inner leg or ring 56. A restricted portion or ring 57 of greater normal diameter than bore 41 before ring 57 is inserted therein is made of less height than the stem seal on the outer leg. The ring 57 extends beyond the remainder of the particular wall 55 involved so as to be of greater diameter than the remainder of said wall before insertion into the bore. As mentioned, the diameter of portion 57 is made greater than the diameter of bore 41 (Figure 3) of the valve body so that when valve stem seal 52 is inserted into the bore 41, the leg adjacent ring 57 will be bent inwardly, and thus a portion of the ring or leg thereabove will be stressed. This will result in a tight joint regardless of expansion of parts when under high pressure.

The diameter of the interior restricted portion or projecting ring 58 is less than the diameter of valve stem 59 (Figure 3) before insertion of the valve stem therein so that when the stem is in place (Figure 3), the inner leg 56 will be stressed or tend to move into tight contact with the stem and thus will firmly engage said valve stem 59.

Valve stem 59 may have a screw threaded portion 60 (Figure 3) cooperating with the screw threads 61 in the interior bore in gland nut 62. The valve stem 59 may have a suitable hand wheel 63 mounted thereon, and a gland lock nut 64 may be provided so as to lock the gland nut 62 in place. Gland nut 62 will hold the various parts, including the valve stem seal 52, valve cage 45, valve seat insert 43, and valve seat holder 40, in assembled relationship in bore 41 of the valve body.

The valve stem seal 52 may be provided with a threaded portion 65 for receiving a suitable pull-out rod 66 (Figure 6) for removal thereof. As can be seen in Figure 8, pull-out rod 66 also can be inserted into the screw threaded aperture 51 of valve cage 45 for removal of the valve cage and other parts as a unit from the bore 41 of the valve body.

Another form of the valve stem seal is shown in Figure 9 wherein seal 74 has an annulus 75 defining outer leg 76 and inner leg 77. The said outer leg 76 is of greater diameter at its end than at its upper portion. Thus, when it is inserted into the bore 41 (Figure 6), it will be bent inwardly so as to cause a stressing and tight engagement with the bore thereof. Similarly, when the valve stem is inserted into the stem aperture 78 of the valve stem seal 74, the lower ends of 77 will be stressed.

The valve seat holder 40 may have a skirt-like seal arrangement 67 (Figures 3, 4) fastened at its central portion to an annular enlargement 68 of the valve seat holder 40. The skirt has annular portions 69 which are of a greater diameter than the central portion 70, said annular portions being adjacent the outer edges of the skirt-like seal.

When the valve seat holder 40 is inserted in bore 41', the outer edges of the seal skirt 67 will be bent inwardly so as to stress the respective legs thereof and result in a tight seal with the walls of the bore 41' at all times regardless of expansion of parts. The skirt may be made of stainless steel or other suitable metal.

In another form, the skirt-like seal may have its outer edges normally bent outwardly as illustrated in Figures 6, 7, and 8. In this instance, the skirt seal 71 has its outer edges 72, 72, of greater diameter than the central portion 73. As the valve seat holder is inserted into bore 41 (Figure 8), the lower edge 72 of the skirt valve seat seal will be pressed inwardly so as to stress adjacent portions of the skirt seal. When it is completely in bore 41', it will take the shape illustrated in Figure 6 and thus hold the parts pressure tight regardless of expansion thereof under high pressure.

A plug 80 (Figure 3) can be inserted in the opening 79 which is to be blanked off in the arrangement shown. The opening 49 could have the plug therein instead of opening 79. Plug 80 may comprise bushing 81 with a recess 82 at the inner face. Nipple or plug 83 may have a tapered inner end 84 engaging a complementary surface of the valve body. The nipple or plug 83 may have a collar 85 screw threadedly adjustable thereon, said collar 85 being engaged by recess 82 to hold the plug 83 in closed relationship with the valve body. A bleed hole 86 is provided so that upon opening the plug, pressure will immediately escape through the bleed hole rather than to exert force on the plug parts. The plug 83 can be closed off or be solid.

Opening 87 (Figures 1, 3) can be present leading to a test gauge or other device to indicate leakage.

It is apparent that various details of construction can be changed without departing from the spirit of the invention except as defined in the appended claims.

What is claimed:

1. In a high pressure valve, the combination including a valve body having a stem receiving aperture, an inlet passage, and an outlet passage, a valve seat means insertable through said stem receiving aperture into one of said passages, said seat means having a fluid passage therethrough, a valve cage fastened to said seat means and having port means therein communicating with said outlet passage and when the valve is in an open position providing communication between said inlet and outlet passages, said cage having an aperture therethrough with a threaded portion for receiving a pull-out rod, a valve stem seal means having an aperture therethrough with a threaded portion for receiving a pull-out rod, a valve stem insertable in said seal means and cage, said stem having a valve engageable with said valve seat means, and a gland nut screw-threadedly engageable in said body holding said seat means, seal means, and cage in assembled relationship.

2. In a high pressure valve, the combination including a valve body having a bore, an inlet passage, and an outlet passage, and an outlet passage, a valve seat holder insertable through said stem receiving aperture into one of said passages, a valve seat insert mountable in said holder, said insert having a fluid passage therethrough and a valve seat, a valve seat holder seal on said holder, a valve cage fastened to said seat holder and having port means therein communicating with said outlet passage and when the valve is in an open position providing communication between said inlet and outlet passages, said cage having an aperture therethrough with a threaded portion for receiving a pull-out rod, a valve stem seal gland having an aperture therethrough with a threaded portion for receiving a pull-out rod, a valve stem insertable through said gland and cage, said stem having a valve engageable with said valve seat, and a gland nut screw-threadedly engageable in said body holding said seat, gland, cage, and valve seat in assembled relationship.

3. In a high pressure valve, the combination including a valve having a bore, an inlet passage, and an outlet passage, a valve seat holder insertable into said bore, a valve seat insert insertable in said holder, said insert having a fluid passage therethrough connecting with one of said previously mentioned passages, a valve seat holder seal engageable with the walls of said bore, a valve cage fastened to said seat and having port means therein communicating with said outlet passage and when the valve is in an open position providing communication between said inlet and outlet passages, said cage having a stem receiving aperture therethrough with a threaded portion for receiving a pull-out rod, a valve stem seal gland having a stem receiving aperture therethrough with a threaded portion for receiving a pull-out rod, seal washer means between said valve cage and seal gland, a valve stem insertable in said gland and cage, said stem having a valve engageable with said valve seat, and a gland nut screw-threadedly engageable in said body holding said seal gland, cage, and valve seat in assembled relationship, said gland nut screw having a threaded engagement with said stem, whereby said stem and valve can be moved relative to said valve body.

4. In a high pressure valve, the combination including a valve body having a bore, a stem receiving aperture, an inlet passage and an outlet passage, a valve seat means insertable into said bore, said means having a fluid passage connecting with one of the aforementioned passages, a sealing skirt surrounding at least a portion of said valve seat means, said skirt comprising a thin wall member with the end portions bowed outwardly with respect to the longitudinal axis of the skirt, said end portions having a greater diameter than said bore before insertion therein, said skirt wall being capable of being stressed so that the skirt wall portion of lesser diameter will be stressed when in assembled relationship providing a seal between said body and valve seat means, and a valve stem insertable in said body cooperable with said valve seat means for controlling fluid flow through said valve body.

5. In a high pressure valve, the combination including a valve body having a bore, a stem receiving aperture, an inlet passage and an outlet passage, a valve seat means insertable into said bore, said means having a fluid passage connecting with one of the aforementioned passages, a sealing skirt surrounding at least a portion of said valve seat means, said skirt comprising a thin wall member with an annular flange portion adjacent each end thereof, each annular flange portion being of greater diameter than said bore before insertion therein, said skirt wall being capable of being stressed so that the skirt wall portion of lesser diameter will be stressed when in assembled relationship providing a seal between said body and valve seat means, and a valve stem insertable in said body cooperable with said valve seat means for controlling fluid flow through said valve body.

References Cited in the file of this patent

UNITED STATES PATENTS

| | | |
|---|---|---|
| 222,217 | Watson | Dec. 2, 1879 |
| 1,210,707 | Schweinert | Jan. 2, 1917 |
| 1,379,139 | Testel | May 24, 1921 |
| 1,495,858 | McGinnis | May 27, 1924 |
| 1,677,794 | Mueller | July 17, 1928 |
| 1,861,916 | Hennebohle | June 7, 1932 |
| 1,985,382 | Schacter | Dec. 25, 1934 |
| 2,172,073 | Smith | Sept. 5, 1939 |
| 2,521,692 | Costello | Sept. 12, 1950 |

FOREIGN PATENTS

| | | |
|---|---|---|
| 292,387 | Great Britain | 1928 |